(No Model.)

J. MILLER.
REFRIGERATOR.

No. 264,186. Patented Sept. 12, 1882.

Witnesses,
Geo. H. Strong
L. H. Nurse

Inventor,
James Miller
Dewey & Co.
Attorneys

UNITED STATES PATENT OFFICE.

JAMES MILLER, OF OAKLAND, CALIFORNIA.

REFRIGERATOR.

SPECIFICATION forming part of Letters Patent No. 264,186, dated September 12, 1882.

Application filed May 27, 1882. (No model.)

*To all whom it may concern:*

Be it known that I, JAMES MILLER, of Oakland, county of Alameda, State of California, have invented an Improved Refrigerator; and I hereby declare the following to be a full, clear, and exact description thereof.

My invention relates to the class of refrigerators; and it consists generally in the construction and arrangement of peculiar vessels providing for the holding of the substance to be kept cool, a surrounding and underlying water-space, and a water-supply.

It consists particularly in a water-vessel set within a shallow dish, and containing a holding-vessel set therein on legs and smaller in diameter, whereby a space is formed around and under said vessel, and in a peculiar cap or cover to supply said space with water, as will hereinafter fully appear.

The object of my invention is to provide a simple, economical, and effective refrigerating device for containing any substance or article which should be kept cool.

Figure 1:
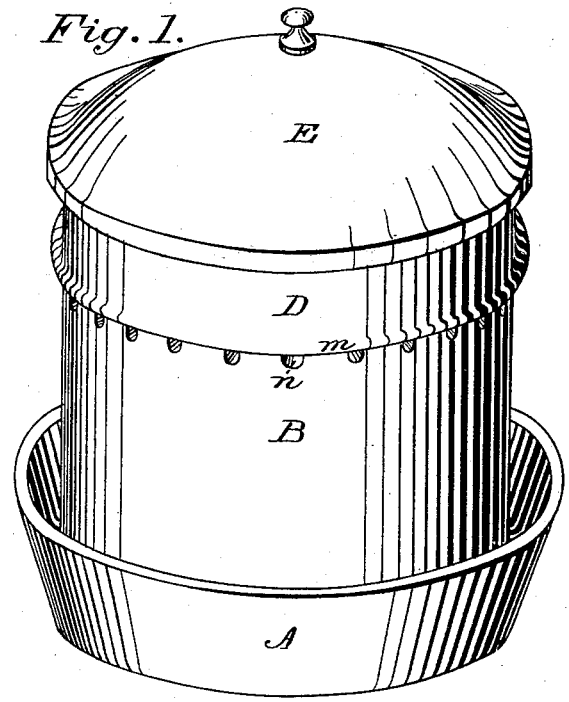
Figure 2:
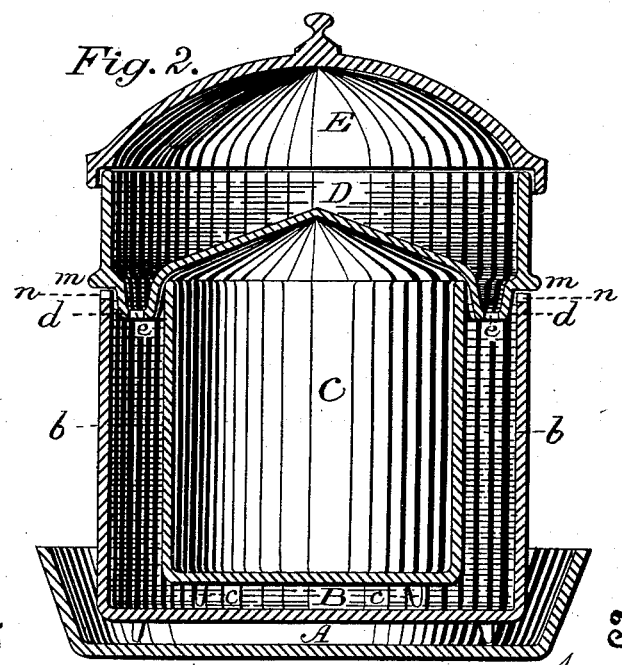

Figure 1 is a perspective. Fig. 2 is a section.

Let A represent a shallow dish or plate. Within this upon legs is placed a vessel, B, of any suitable height, designed to contain water.

C is the holder, an ordinary vessel provided with legs $c$, and smaller in diameter than vessel B, but a little higher than said vessel when set therein. Between it and the water-vessel B is left a space, $b$, around the circumference of holder C and under it, into which the water is to remain. The holder being higher than the water-vessel the water cannot flow over into it to injure its contents.

D is a vessel, the bottom of which is either convex upon its inner side or is made in upwardly-inclined surfaces to its center, as shown in Fig. 2. In this bottom, at its lower part—that is, near its outer edge—is made a downwardly-extending lip, $d$, in which are openings $e$ around the whole vessel. Shoulders or flanges $m$ are made upon the edge of vessel D, which support it upon the top of the water-vessel B, to which it is fitted, and small holes or apertures $n$ in the top of said vessel provide for the escape of the water. When in this position its lip $d$ extends down into the water-space $b$, as shown.

E is a lid or cover on the supply-vessel D.

When the holding-vessel C, with its contents, is placed within the vessel B the supply cap or cover D is fitted on top of B, and water is poured in its open top, the lid E being removed.

The object in constructing the bottom of the supply-cap with a bottom sloping down to its outer edge is to provide for the flow of the water to the circular opening $e$. This cover is to be made of pottery-ware, and if it had a straight bottom the water which would not flow off readily would in time sink or filter through upon the contents of the holder C; but by this construction the water flows off readily to the opening $e$, and fills the water-space around and under the holder. This water-space is to be kept full. It can be known when a sufficient supply is given by the discharge through openings $n$, from which the water will flow down the sides of the vessel B into the plate A. The air-space between the top of the inclined bottom of the supply-cap is more beneficial than if the cap fit down tightly.

If desired, the cap D may be removed after supplying the water-vessel, and the cover E placed upon the top of the device.

I am aware that refrigerators of many conformations have heretofore been made having the general characteristics of my invention, and hence I limit myself to the construction herein shown and described.

Having thus described my invention, what I claim as new, and desire to secure by Letters Patent, is—

A refrigerator consisting of the water-vessel B, with its apertures $n$ at its top, the waste-plate A, the holding-vessel C, smaller in diameter than the vessel within which it is set upon legs $c$, to provide a water-space, $b$, around and under it, and the water-supply cap or vessel D, having a bottom convex or upwardly inclined upon its inner side, a circumscribing lip, $d$, with an opening, $e$, and shoulders $m$ for supporting it upon the top of the water-vessel B, substantially as herein described.

In witness whereof I have hereunto set my hand.

JAMES MILLER.

Witnesses:
C. D. COLE,
J. H. BLOOD.